United States Patent
Teo

(10) Patent No.: US 11,334,665 B2
(45) Date of Patent: May 17, 2022

(54) SYSTEMS AND METHODS FOR AUTOMATED DETECTION AND ANALYSIS OF SECURITY THREATS

(71) Applicant: JPMorgan Chase Bank, N.A., New York, NY (US)

(72) Inventor: Jia Yeong Lionel Teo, Singapore (SG)

(73) Assignee: JPMORGAN CHASE BANK, N.A., New York, NY (US)

(*) Notice: Subject to any disclaimer, the term of this patent is extended or adjusted under 35 U.S.C. 154(b) by 321 days.

(21) Appl. No.: 16/250,013

(22) Filed: Jan. 17, 2019

(65) Prior Publication Data
US 2020/0233954 A1 Jul. 23, 2020

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 2221/033* (2013.01); *G06F 2221/034* (2013.01); *G06F 2221/2115* (2013.01)

(58) Field of Classification Search
CPC .. G06F 21/554; G06F 21/56; G06F 2221/034; G06F 2221/033; G06F 2221/2115; G06F 21/577; G06F 21/564
See application file for complete search history.

(56) References Cited

U.S. PATENT DOCUMENTS

| | | | |
|---|---|---|---|
| 5,557,278 A * | 9/1996 | Piccirillo | G01S 13/86 342/29 |
| 9,516,053 B1 * | 12/2016 | Muddu | H04L 63/1433 |
| 9,686,293 B2 * | 6/2017 | Golshan | G06F 21/561 |
| 2009/0089869 A1 * | 4/2009 | Varghese | G06Q 20/4014 726/7 |
| 2009/0106737 A1 * | 4/2009 | Chockler | G06F 11/3604 717/126 |
| 2013/0096980 A1 * | 4/2013 | Basavapatna | G06Q 10/00 705/7.28 |
| 2016/0261616 A1 * | 9/2016 | Shulman | H04L 63/0272 |
| 2017/0031741 A1 * | 2/2017 | Seigel | H04L 41/069 |
| 2017/0214702 A1 * | 7/2017 | Moscovici | H04L 43/062 |
| 2018/0278631 A1 * | 9/2018 | Harris | H04L 63/102 |
| 2018/0288063 A1 * | 10/2018 | Koottayi | H04L 63/102 |

* cited by examiner

*Primary Examiner* — Meng Li
(74) *Attorney, Agent, or Firm* — Greenberg Traurig LLP

(57) ABSTRACT

Systems and methods for automated detection and analysis of security threats are disclosed. In one embodiment, in an information processing apparatus comprising at least one computer processor, a method for automated detection and analysis of security threats may include the following: (1) receiving an item from an asset; (2) inspecting the item using at least one rule; (3) determining an exposure related to the item to determine an exposure to the item; (4) enriching the item with additional data; (5) calculating a total score for the item based on the inspection, the exposure, and the enriching; and (6) generating an alert for the item based on the total score exceeding a threshold.

20 Claims, 2 Drawing Sheets

SYSTEMS AND METHODS FOR AUTOMATED DETECTION AND ANALYSIS OF SECURITY THREATS

BACKGROUND OF THE INVENTION

1. Field of the Invention

The present invention generally relates to systems and methods for automated detection and analysis of security threats.

2. Description of the Related Art

Existing information security detection rules fires upon detecting potential security threats based on statistic or signature matching. These matches are typically a single phase detection. If the detection rules are poorly written, or if the signatures are loosely-defined, there would be a high instance of false positives. A security operation center would respond to this by creating a case, attending to the alerts, and determining whether they are false positives.

SUMMARY OF THE INVENTION

Systems and methods for automated detection and analysis of security threats are disclosed. In one embodiment, in an information processing apparatus comprising at least one computer processor, a method for automated detection and analysis of security threats may include the following: (1) receiving an item from an asset; (2) inspecting the item using at least one rule; (3) determining an exposure related to the item to determine an exposure to the item; (4) enriching the item with additional data; (5) calculating a total score for the item based on the inspection, the exposure, and the enriching; and (6) generating an alert for the item based on the total score exceeding a threshold.

In one embodiment, the asset may include at least one of an end host, a server, a network appliance, and a third party application.

In one embodiment, the item may include at least one of a Windows event log, a Linux Syslog, an Apache access log, a firewall log, and a cloud API call log.

In one embodiment, the item may be pulled from the asset by a collecting agent.

In one embodiment, the at least one rule may include one or more of a signature analysis rule and a statistical analysis rule.

In one embodiment, the rule may detect a rare windows persistence point, a rare user program execution, a rare PowerShell execution, a rare new autorun entry, an antivirus alert, a known bad signature, potential unknown malware, and/or a potential unknown application being executed.

In one embodiment, the method may further include adding the item to a suspicious list based on the inspection using the at least one rule.

In one embodiment, the suspicious list may also include the rule that caused the item to be added to the suspicious list and a timestamp.

In one embodiment, the additional data may include a virus scanning report, IP geolocation data, IP registration information, and/or an IP to physical location mapping.

In one embodiment, the additional data may be received from a third party.

In one embodiment, the method may further include calculating a confidence level in the enrichment.

In one embodiment, the method may further suppressing a subsequent alert for the same item.

According to another embodiment, a system for automated detection and analysis of security threats may include at least one asset being monitored; a watch rule database; an exposure check rule database; and at computer program executed by at least one computer processor. The computer program may perform the following: (1) receive an item from an asset; (2) inspect the item using at least one rule from the rule database; (3) determine an exposure related to the item to determine an exposure to the item using at least rule from the exposure check rule database; (4) enrich the item with additional data; (5) calculate a total score for the item based on the inspection, the exposure, and the enriching; and (6) generate an alert for the item based on the total score exceeding a threshold.

In one embodiment, the asset may include at least one of an end host, a server, a network appliance, and a third party application.

In one embodiment, the item comprises at least one of a Windows event log, a Linux Syslog, an Apache access log, a firewall log, and a cloud API call log.

In one embodiment, the system may further include a collection agent that pulls the item from the asset.

In one embodiment, the rule comprises one or more of a signature analysis rule and a statistical analysis rule, and the at least one rule detects at least one of a rare windows persistence point, a rare user program execution, a rare PowerShell execution, a rare new autorun entry, an antivirus alert, a known bad signature, a potential unknown malware, and a potential unknown application being executed.

In one embodiment, the additional data may be received from a third party, and the additional data comprises at least one of a virus scanning report, IP geolocation data, IP registration information, and IP to physical location mapping.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to systems and methods for automated detection and analysis of security threats.

In one embodiment, a framework built on security information and event management (SIEM), separates the detection and exposure. Thus, instead of causing a security thread to trigger monitoring, it instead initiates an internal exposure check watch list. A scheduled job may be performed to check against multiple vectors, and each check may return scores based on the confidence of those vectors. The scores may be stored in another list for final potential alert triggering, and another scheduled job reviews the scores and alerts only when the confidence level (e.g., the sum of the scores) is above a threshold.

Figure 1:
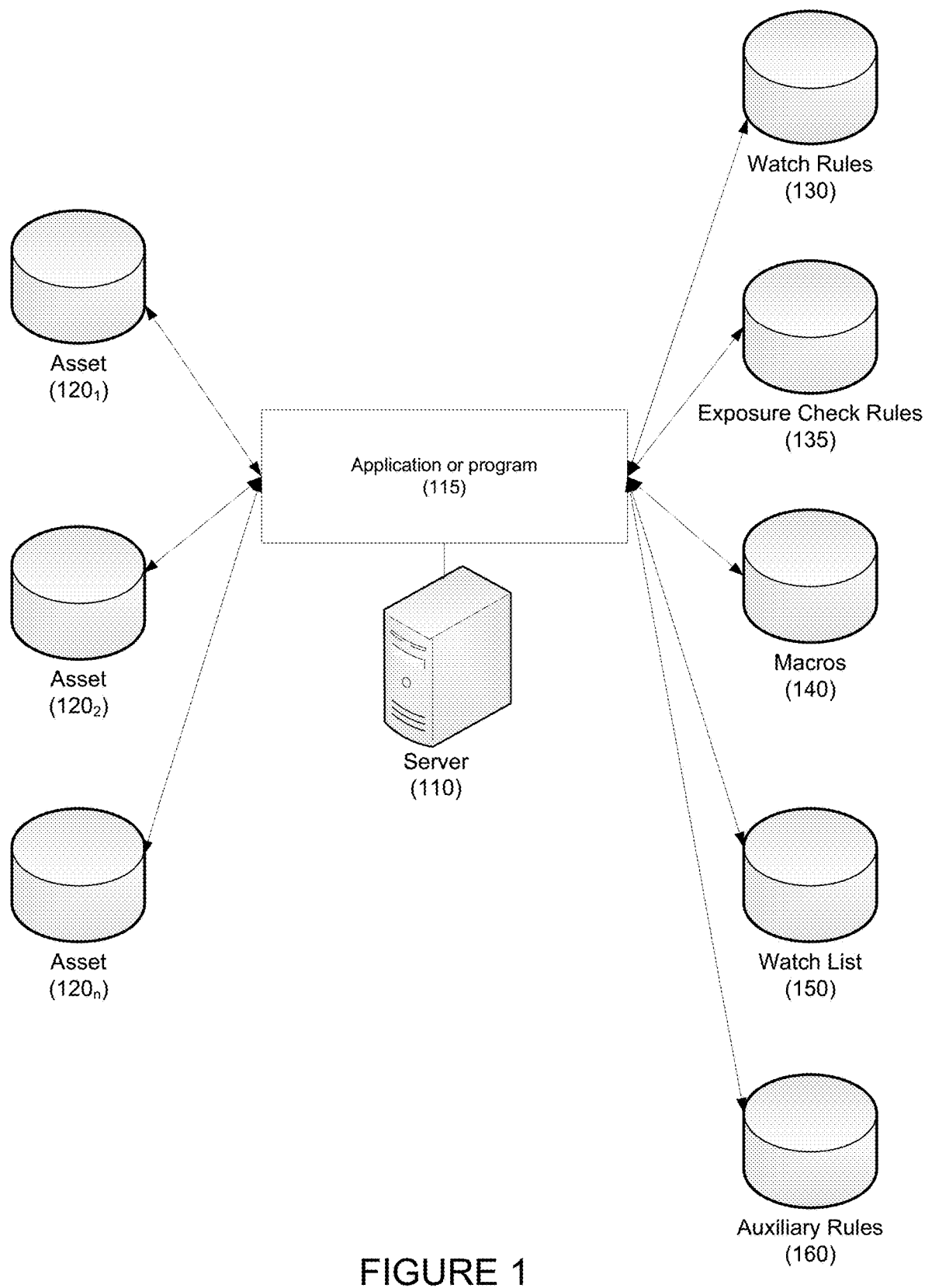
FIG. 1 depicts a system for automated detection and analysis of security threats using a distributed ledger according to one embodiment.

Referring to FIG. 1, a system for automated detection and analysis of security threats is disclosed. System 100 may include: server 110 that may execute computer application or computer program 115, a plurality of assets $120_1$, $120_2$, ... $120_n$, watch rules 130, macros 140, watch list 150, and auxiliary rules 160.

In one embodiment, computer application or computer program 115 may include a SIEM software application.

In one embodiment, assets $120_1$, $120_2$, ... $120_n$ may include one or more database, data stream, or system that may be monitored. In one embodiment, assets 120 may include end hosts (e.g., Windows, Linux, etc.), servers (e.g., proxy servers, application servers, etc.), network appliances (e.g., firewalls), third party applications or platforms (e.g., cloud platform, distributed denial of service (DDoS) providers, etc.), etc.

In one embodiment, one or more item may be retrieved from assets 120. For example, logs, such as Windows event logs, Linux Syslogs, Apache access logs, firewall logs, cloud API call logs, etc. may be retrieved. In one embodiment, logs may be retrieved by push and/or pull methods using, for example, a collection agent that may be installed on end nodes or on the network.

For example, collecting agents may pull logs from assets 120 at fixed intervals (e.g., hourly), or by streaming log data from assets 120. As another example, logs may be collected using a push method using, for example, Simple Network Management Protocol ("SNMP") traps sent from SNMP trap compatible end nodes for unexpected events, or for pre-defined events.

Server 110 may be one or more servers, computers, etc. that may execute computer application or program 115. Computer application or program 115 may monitor assets $120_1$, $120_2$, ... $120_n$, may apply watch rules (e.g., ADD_WATCH rules) from watch rules database 130, macros from macro database 140, items from watch list database 150, and rules from auxiliary rules database 160.

In one embodiment, watch list database 150 may include, for example, a listing of potentially suspicious items such as rare windows persistence points.

In one embodiment, rare windows persistence points may include the bottom N (N=50 by default) windows persistence points observed within an environment. The windows persistence points include, for example, filename, file_hash, IP address, hostname, username and persistent point of registry key; different ADD_WATCH rules may have different collecting criteria and different output, and may be normalized by storage in watch list database 150.

Exposure check rules 135, such as RUN_CHECK rules, may be applied as is necessary and/or desired. In one embodiment, the exposure check rules may check suspicious items using, for example, timelines, watch rules, etc.

Auxiliary rules 160 may be applied to enrich the items, with, for example, third party data (e.g., virus scanning reports, IP geolocation data, IP registration information, IP to physical location mapping, etc.).

Figure 2:
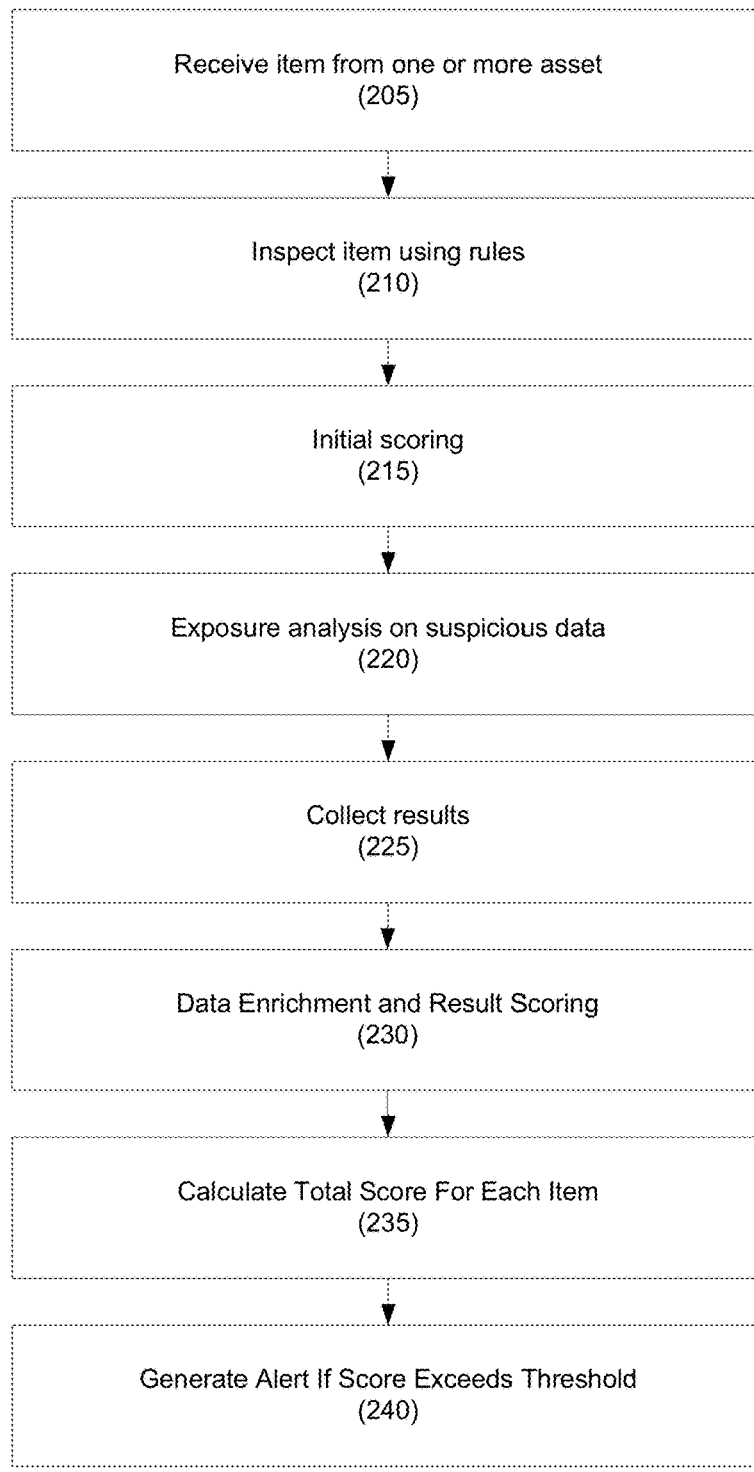
FIG. 2 depicts a method for automated detection and analysis of security threats according to one embodiment.

Referring to FIG. 2, a method for automated detection and analysis of security threats is disclosed according to one embodiment.

In step 205, items may be retrieved from one or more asset. In one embodiment, assets may include databases, data streams, or systems. Examples assets include end hosts (e.g., Windows, Linux, etc.), servers (e.g., proxy servers, application servers, etc.), network appliances (e.g., firewalls), third party applications or platforms (e.g., cloud platform, distributed denial of service (DDoS) providers, etc.), etc. The items retrieved may include, for example, system logs, event logs, performance metric, etc.

In one embodiment, collecting agents may retrieve logs by pulling data from the assets, by streaming data from the assets, etc. In another embodiment, logs may be pushed by the assets using, for example, SNMP traps.

In one embodiment, the items may include logs, such as Windows event logs, Linux Syslogs, Apache access logs, firewall logs, cloud API calls, etc.

In one embodiment, the items may include logs, programs, applications, operating system and network data, etc.

In one embodiment, the data may be associated with one or more attributes, including, for example, address (e.g., the IP address for the asset), the host name (e.g., the short name of the asset that uniquely identifies the asset), and user name (e.g., the assigned owner of the asset).

In one embodiment, each asset may be associated with, or have, a log, and the logs may be stored and forwarded to the SIEM software component in real-time, or substantially in real-time, via, for example, file transfer.

In step 210, the data may be inspected to identify potentially suspicious items using, for example, signature analysis and/or statistical analysis.

In one embodiment, rules may be used to detect rare windows persistence points, rare user program execution, rare PowerShell execution, rare new autorun entries, antivirus alerts triggered on client machine, etc. For example, a computer program or application may monitor alerts by SIEM tools, such as ArcSIGHT.

With signature-based inspection, a known bad signature, such as HTTP POST to a non-categorized domain, may be identified as suspicious. In other words, some outbound traffic towards an unknown domain may be an indication of a command and control (C2) infection or initiation of data exfiltration.

With statistical-based inspection, items that have attributes that vary from the same data set (e.g., outliers) may be identified. For example, among the running processes captured on the same type of workstations, if a unique process hash has been shown in fewer than a certain threshold of hosts, this may indicate potential unknown malware or applications that are executing.

The output may be collected by a function that collects normalized data. Parsing may be performed to normalized the items.

In step 215, based the rules-based inspection and the signature-based and statistical-based inspection, an initial score may be assigned as a base score and associated with the item. If the score exceeds a certain threshold, the item may be added to the suspicious list.

In one embodiment, the suspicious list may include a timestamp and an identification of the rule that caused the item to be added to the suspicious list.

In one embodiment, cleanup functions may be used to purge the list at fixed intervals, when a certain number of items are on the list (e.g., a maximum number of items are on the suspicious list), for repeated violations of the same item, etc. In one embodiment, the latest detection time may be updated on the suspicious list to indicate the data record is still fresh and valid.

In step 220, an exposure check may be performed. In one embodiment, the exposure check may be performed to assess the potential exposure that a suspicious item has on the assets with the organization.

In one embodiment, the exposure check may be performed on all items identified as suspicious by the rules-based analysis above; in another embodiment, only certain suspicious items may be checked for exposure.

For example, the exposure check may be run against items having a specific reason for being added to the suspicious list (e.g., the exposure check may not run against the entire suspicious list, but only against a predefined list that matches the criteria to perform such exposure check), for items that were added during a specific exposure check time period (e.g., part of dynamic scoring that depends on the exposure check type. The exposure check period depends on the reason and exposure check rules), etc.

In one embodiment, multiple exposure checks may be run in sequence, may be run based on the knowledge of different threat (e.g., a malware infection with a high-level system (e.g., a command and control server) will have first OS persistence point establishment, malware execution then follows the high-level system call out activity, exposure check will add up scores if sequences of actions matches the behavior of typical malware infection with high-level system call out activity), etc.

In one embodiment, exposure check rules may be used to calculate additional confidence based on the exposure check conducted.

Example exposure rules may get an entry from the database, and may perform exposure checks. If the entry matches, the score associated with exposure check type and related asset may be added into the total score. For example, if there is a persistence point added into an asset, the exposure check will be performed to determinate if there are C2 beaconing activity around the time of detection persistence point was added.

In step 225, results may be collected. For example, raw results from the exposure check may be added to the results of the rules-based inspection and the signature-based and statistical-based inspection to update the initial score.

In one embodiment, exposure checks may be categorized as C2, new process created for the asset, etc. Other categorizations may be used as is necessary and/or desired. For example, a potential C2 communication may be identified if the asset attempted to connect to websites (domain names) that are categorized as uncategorized, malicious, direct IP, landing page, or placeholders. In one embodiment, scores from those exposure checks may be summed. For exposure checks within the same category, the highest score may be used.

In embodiments, the exposure check may be performed by operation knowledge base, which may be targeted to reduce the false negative rate.

The score may be stored, and represents the knowledge based on the item.

In step 230, the score data for each item may be enriched. In one embodiment, internal and/or external (e.g., third party) data may be used to enrich the items. For example, the data may be enriched with results of virus scanning reports, IP geolocation data, IP registration information, IP to physical location mapping, etc.

In one embodiment, auxiliary rules may be applied to the items to calculate the confidence level in the enrichment with pre-configured mathematical macros, or to assign a static value to adjust the confidence level of the activity.

For example, the auxiliary rules may check a file hash against Virus Total, and either returns hash not found, where no score is added, or a hash found, in which a score may be added. In one embodiment, if the hash is found, the base score may be provided to a logarithmic grow function and the score may be based on the number of antivirus engine detections.

In one embodiment, to further increase the accuracy of detection, there may be a cut-off period (e.g., three months) that if the suspicious hash was scanned recently (within 3 months), the total confidence level will be −40, while more than three months will receive a score of −20. Thus, the maximum score that the auxiliary rules may receive is get is 80 (i.e., 100−20), the reason adding the recent detection was due to AV engine may have false alarm or missed detection, any results longer than three months will be more reliable.

In step 235, a total score for each suspicious item may be calculated. In one embodiment, the scores from each step may be added to result in the total score. For example, the add watch rule score, the rule check score(s), and the data enrichment score, may be summed.

In one embodiment, the score may exceed 100, but the maximum score recorded may be 100.

In step 240, an alert may be generated if the total score for an item exceeds a threshold. In one embodiment, the total score may be based on the asset host name, the asset address, asset user name, etc.

For example, an alert may be triggered for scores over 90, and subsequent alerts may be provided for the same item may be suppressed for a certain period of time (e.g., 72 hours) to prevent flooding the alert channel.

For each alert fired, multiple entries may be included in the alert, including the final score from step 235, each exposure check, each inspect data, and each data enrichment.

For example, for an item having a high confidence alert (e.g., score of 95), a sample report may list:
<TIMESTAMP>ASSET XXXXX—SCORE 95
'ADD_WATCH_RULE_XXX'—SCORE 40
'RUN_CHECK_RULE_XX1'—SCORE 20
'RUN_CHECK_RULE_XX2'—SCORE 20
'AUX_DATA_ENRICHMENT_XXX'—SCORE 15

Analysis will know where the score was coining from and have a better picture of triaging the security event.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated detection and analysis of security threats, comprising:

in an information processing apparatus comprising at least one computer processor:

receiving, via a centralized collecting agent, a log comprising a plurality of items from one of a plurality of assets;

identifying a suspicious item in the log by inspecting the plurality of items in the log using at least one rule;

determining that the suspicious item matches a criteria for an exposure check;

determining an exposure of the plurality of assets to the suspicious item;

enriching the suspicious item with additional data;

calculating a total score for the suspicious item based on the inspection, the exposure, and the enriching; and generating an alert for the suspicious item based on the total score exceeding a threshold.

2. The method of claim 1, wherein the asset comprises an end host, a server, a network appliance, and/or a third party application.

3. The method of claim 1, wherein the log comprises a Windows event log, a Linux Syslog, an Apache access log, a firewall log, and/or a cloud API call log.

4. The method of claim 1, wherein the log is pulled from the asset by a collecting agent.

5. The method of claim 1, wherein the at least one rule comprises a signature analysis rule and/or a statistical analysis rule.

6. The method of claim 1, wherein the rule detects a rare windows persistence point, a rare user program execution, a rare PowerShell execution, a rare new autorun entry, and/or an antivirus alert.

7. The method of claim 1, wherein the rule detects a known bad signature.

8. The method of claim 1, wherein the rule detects a potential unknown malware or a potential unknown application being executed.

9. The method of claim 1, further comprising:

adding the suspicious item to a suspicious list based on the inspection using the at least one rule.

10. The method of claim 9, wherein the suspicious list further comprises an identification of the rule that caused the suspicious item to be added to the suspicious list and a timestamp.

11. The method of claim 1, wherein the additional data comprises a virus scanning report, IP geolocation data, IP registration information, and/or an IP to physical location mapping.

12. The method of claim 1, wherein the additional data is received from a third party.

13. The method of claim 1, further comprising calculating a confidence level in the enrichment.

14. The method of claim 1, further comprising:

suppressing a subsequent alert for the same suspicious item.

15. A system for automated detection and analysis of security threats, comprising:
  a plurality of assets;
  a watch rule database;
  an exposure check rule database;
  an electronic device comprising at least one computer processor; and
  a memory comprising a computer program;
  wherein the computer program performs the following:
    receive, via a centralized collecting agent, a log comprising a plurality of items from one of the plurality of assets;
    identify a suspicious item in the log by inspecting the plurality of items in the log using at least one rule from the watch rule database;
    determine that the suspicious item matches a criteria for an exposure check;
    determine an exposure of the plurality of assets to the suspicious item using at least rule from the exposure check rule database;
    enrich the suspicious item with additional data;
    calculate a total score for the suspicious item based on the inspection, the exposure, and the enriching; and
    generate an alert for the suspicious item based on the total score exceeding a threshold.

16. The system of claim 15, wherein the asset comprises an end host, a server, a network appliance, and/or a third party application.

17. The system of claim 15, wherein the log comprises a Windows event log, a Linux Syslog, an Apache access log, a firewall log, and/or a cloud API call log.

18. The system of claim 15, further comprising a collection agent that pulls the item from the asset.

19. The system of claim 15, wherein the at least one rule comprises a signature analysis rule and a statistical analysis rule, and the at least one rule detects at least one of a rare windows persistence point, a rare user program execution, a rare PowerShell execution, a rare new autorun entry, an antivirus alert, a known bad signature, a potential unknown malware, and/or a potential unknown application being executed.

20. The system of claim 15, wherein the additional data is received from a third party, and the additional data comprises a virus scanning report, IP geolocation data, IP registration information, and/or IP to physical location mapping.

* * * * *